Jan. 12, 1971 J. R. HANE 3,554,577
SAFETY BELT SYSTEM

Filed Jan. 19, 1970 2 Sheets-Sheet 1

INVENTOR.
JOHN R. HANE
BY *C. Emmett Pugh*
ATTORNEY

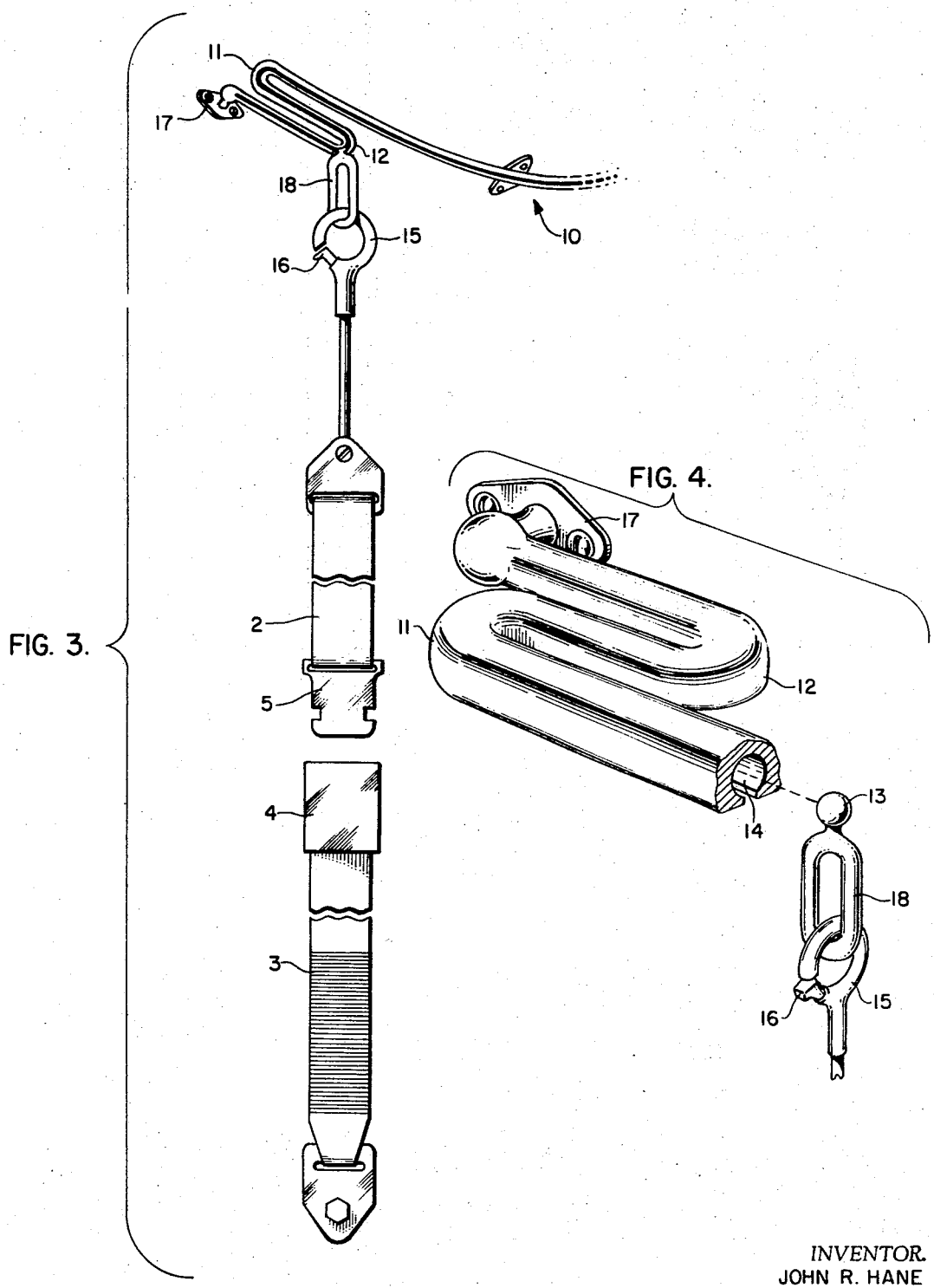

United States Patent Office 3,554,577
Patented Jan. 12, 1971

3,554,577
SAFETY BELT SYSTEM
John R. Hane, P.O. Box 444, Shalimar, Fla. 32579
Filed Jan. 19, 1970, Ser. No. 3,906
Int. Cl. B60r 21/10
U.S. Cl. 280—150          10 Claims

ABSTRACT OF THE DISCLOSURE

A safety belt system for vehicles wherein an over-the-shoulder belt is attached at its upper end to a semi-circular track mounted on the roof of the vehicle whereby the belt can be moved in and out of its operative position quickly and easily.

BACKGROUND OF THE INVENTION

The present invention relates to a safety belt system for the protection of the occupants of a car in an accident or collision, particularly one in which the belt is, at least in part, of the over-the-shoulder variety.

The system of the present invention is particularly designed to solve the many problems which have caused the consumer not to use seat belts even though the belts are now standard equipment on most vehicles.

Seat belts in vehicles have proved highly valuable in preventing serious injuries, or at least in lessening the degree of seriousness, and saving lives when a vehicle is in a collision. However, many people dislike having seat belts in their vehicles because such belts are very often in the way when not in use. Moreover, the usual seat belt when not in use is generally in a position where it is not easily accessible and ready for quick and easy application. Often the parts of the standard belt fall under the seat, or become caught between the bottom of the seat and the backrest or between the car floor and the door when the latter is closed.

Additionally, some people hesitate to use the usual seat belts because the belts becomes dirty when allowed to rest on the car floor in a haphazard manner or to fall through the door, when it is open, and drop on the ground.

It is a recognized fact that the general public resistance to the use of safety belts is in large part due to the inconvenience of attaching and detaching the belt for use.

Accordingly, it is a basic object of the present invention to provide an improved safety belt system which overcomes or at least minimizes the foregoing prior art problems, and wherein means are provided for holding the seat belt out of the way when not in use, yet the seat belt is always readily and easily put in to use by an occupant of the vehicle.

Although others have tried to solve the problem of consumer non-use of safety belts, it is believed that none have disclosed a system as efficacious as that of the present invention.

BRIEF DESCRIPTION OF THE DRAWINGS

FIG. 3 is a plan view of the details of the safety belt itself and its mating connection with the over-head track of the safety belt system; and FIG. 4 is a perspective view of the S-portion of the over-head track, partially cut away, further showing the mating of the upper part of the safety belt with the track.

DESCRIPTION OF THE PREFERRED EMBODIMENT

For illustrative purposes, the safety belt system of the present invention is shown as applied to a standard car vehicle having two bucket style seats in the front.

Figure 2:
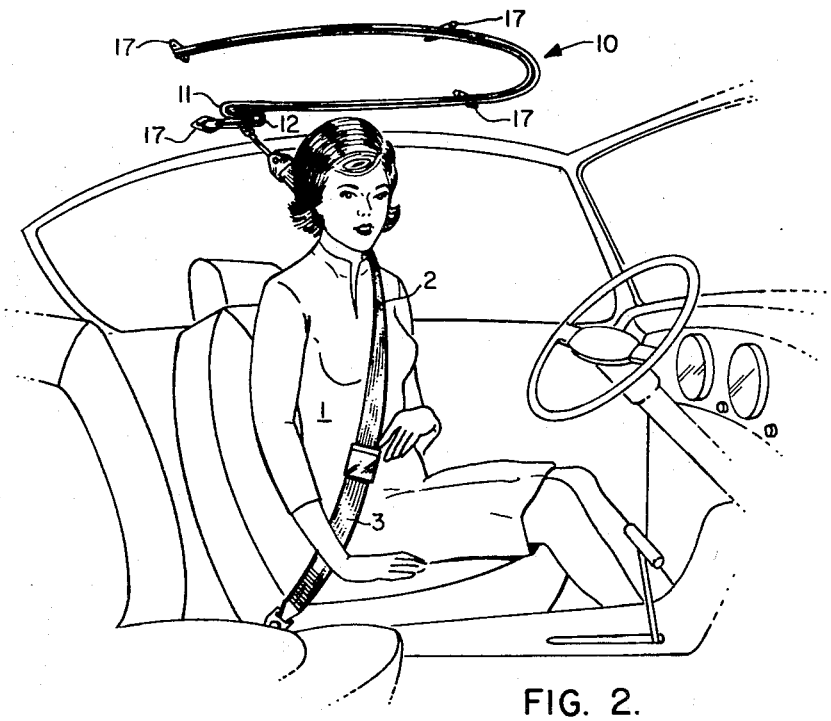
FIG. 2 is a perspective, side view of the safety belt system in its operative position.
Figure 1:
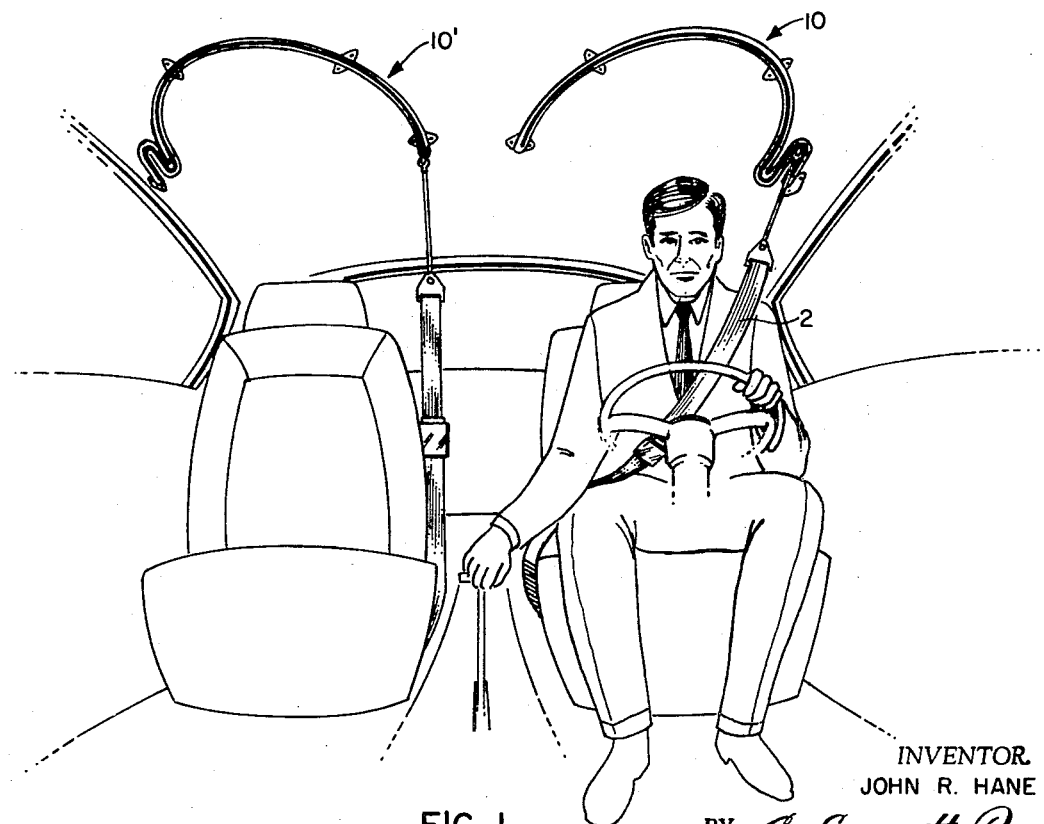
FIG. 1 is a perspective, front view of the safety belt system of the present invention in use on a two-seater vehicle, showing the system in its safety or operative position on the driver's side and its inoperative position on the passenger's side.

As shown in FIGS. 1 and 2, the preferred embodiment of the safety belt system of the present invention comprises a regular chest or over-the-shoulder seat belt 1 of standard design attached at one end 3 to the floor or vehicle chassis in the known standard manner. At its upper end 2 the safety belt is slidably attached to and in a semi-circular track 10 mounted on the roof of the vehicle by attachment means such as the dog ears 17.

As best shown in FIGS. 3 and 4, the track 10 although generally semi-circular or U-shaped, also includes an S portion 11, 12 near one of its ends for the purpose of securing or locking the end ball 13 of the safety belt in its operative position (the position shown in the right side of FIG. 1 and in FIG. 2).

The safety belt as shown in FIG. 3 can be of standard design and includes two belt sections 2 and 3 which are locked together by standard locking elements 4 and 5. As indicated above, the lower portion 3 of the belt 1 is attached to the floor or chassis of the vehicle while the upper portion 2 is attached to the track 10 by means of a ball member 13 which rides in, is enclosed by and mates with the cylindrical run 14. For ease in disconnecting the safety belt 1 from the track 10, eyelet member 18 with circlet member 15 are included, the latter having slidable member 16 for opening up the circlet.

When not in use, the safety belt can be placed in its inoperative position, as shown in the left side of FIG. 1.

The belt is easily and quickly placed in its operative position as follows. Upon being seated in the vehicle, the upper portion 2 of the safety belt 1 is then swung forward, around and back, causing the ball 13 to transverse around the track 10 or 10'. By a reverse flick of the wrist on the upper portion 2 of the belt 1, the ball element 13 is then guided through the S portion 11, 12 of the track 10. 10', resulting in the ball element 13 being "locked" in the forward section 12 of the S portion. Thus, when a forward force is placed on the ball element 13, as for example during an accident, the upper portion 2 of the belt 1 is constrained from movement and the passenger is held in the seat. To quickly and easily place the belt 1 back in its inoperative position, the reverse procedure is followed.

It is noted that, having the belt in its inoperative position hang in the center of the vehicle and hence be in the viewing range of the standard rear view mirror, serves as a gentle but continuous reminder to put the seat belt in its operative position while the vehicle is in use. Moreover, as a further convenience one, of course, does not even need to unlock the elements 4 and 5 when moving the belt in and out of its operative position, as is required in the standard, prior art systems.

EXEMPLARY VARIATIONS OF THE PREFERRED EMBODIMENT

As required by the patent statutes, the structure and operation of the preferred embodiment of the present invention have been described in detail, however many variations of these details are possible within the scope of the present invention. Illustrative, but certainly not-exhaustive, of these variations are the following.

Although the preferred embodiment was described with respect to a vehicle with bucket seats, it likewise may be used with the standard bench-type seats. The safety belt system could likewise be applied to vehicles other than cars, such as trucks, airplanes, boats, heavy duty equipment, space vehicles, etc. Where the vehicle is topless or the roof is located at an inconvenient distance from the seats, a self-supporting or independent track mount can be provided.

The overhead track can be of a configuration other than a U and could be of a series of straight lines rather than a simple curve. However a U configuration has been found to be particularly effective because it follows the natural motion of the arm as the belt is moved from one position to the other.

Also, rather than a S section, other means or another configuration could be used to lock the belt in its operative position. Indeed, as to the latter variation, a reverse U rather than a full S would be sufficient. Moreover, an addition S section or other locking means could be added to the other end of the track to provide means for locking the belt in its inoperative position and thereby prevent unrestrained movement of the belt when not in use.

Because of the physical strength characteristics present in a particular application, it may be necessary to use additional strengthening members to "beef up" an installation of the present safety belt system. In particular, the roof of the vehicle may have to be strengthened or more heavy duty attachment means than the dog ears may be necessary. Likewise the particular ball-element-cylinder-run mating system of the preferred embodiment could be changed to provide a stronger link where such is necessary or desirable.

Moreover, rather than the standard design of safety belt as shown particularly in FIG. 3, a unitary belt could be utilized, and the over-the-shoulder safety belt can be combined with the standard lap belt for further protection.

Having described the preferred embodiment and indicating a few exemplary variations, what is claimed as invention is:

1. A safety belt system for a vehicle comprising:
    safety belt means (2–5) for preventing an occupant of the vehicle from being thrown out of his seat when said means is in its operative position;
    over-head anchoring means (10, 10') for providing a system for easily and quickly moving said safety belt means from its inoperative to its operative position and viceversa; said safety belt means being anchored at a lower portion (3) to an anchoring point near or below the surface of said seat and at an upper portion (2) by means of an anchoring element (13) to said overhead anchoring means; said over-head anchoring means including at least three sections—a belt means inoperative section, a belt means operative section (11, 12) and an interconnecting section (10, 10') interconnecting said inoperative and said operative sections; whereby said safety belt means can be moved into and out of its operative position by means of said interconnecting section.

2. The system of claim 1 wherein said safety belt means remains in a unitary condition as it is moved in and out of its operative position.

3. The system of claim 1 wherein said over-head anchoring means is mounted on the roof of the vehicle.

4. The system of claim 1 wherein said operative section includes locking means for locking said belt means in its operative position.

5. The system of claim 4 wherein said three sections comprise an over-head track (10, 10') defining a continuous run (14) mounted above the occupant, said anchoring element riding in said continuous run; whereby said anchoring element traverses said run when said belt means is moved into and out of its operative position.

6. The system of claim 5 wherein said run defines an extended cylindrical surface and said anchoring element includes a spherical or ball element which rides in and mates with said run.

7. The system of claim 5 wherein said interconnecting section forms a continuous, smooth curve.

8. The system of claim 7 wherein said curve is generally U shaped and curves about the seat of the vehicle.

9. The system of claim 5 wherein said locking means comprises at least a reverse U shaped curve (11).

10. The system of claim 9 wherein said locking means comprises an S shaped curve (11, 12).

References Cited
UNITED STATES PATENTS
3,371,960  3/1968  Bayer et al. ............ 297—386

LEO FRIAGLIA, Primary Examiner

W. H. DOUGLAS, Assistant Examiner

U.S. Cl. X.R.

244—122; 297—389